United States Patent
Pigott et al.

(10) Patent No.: US 8,970,209 B2
(45) Date of Patent: Mar. 3, 2015

(54) VRS INTERFACE WITH 1/T ARMING FUNCTION

(75) Inventors: John M. Pigott, Phoenix, AZ (US); Fred T. Brauchler, Canton, MI (US); William E. Edwards, Ann Arbor, MI (US); Mike R. Garrard, Jaywick (GB); Randall C. Gray, Tempe, AZ (US); John M. Hall, Chelsea, MI (US)

(73) Assignee: Freescale Semiconductor, Inc., Austin, TX (US)

( * ) Notice: Subject to any disclaimer, the term of this patent is extended or adjusted under 35 U.S.C. 154(b) by 441 days.

(21) Appl. No.: 13/494,501

(22) Filed: Jun. 12, 2012

(65) Prior Publication Data

US 2013/0328554 A1 Dec. 12, 2013

(51) Int. Cl.
*G01B 7/30* (2006.01)

(52) U.S. Cl.
USPC .................................. 324/207.25

(58) Field of Classification Search
CPC ............................ G01P 3/487–3/489
USPC ........... 324/160–180, 207.11–207.26, 514.39
See application file for complete search history.

(56) References Cited

U.S. PATENT DOCUMENTS

| | | | |
|---|---|---|---|
| 5,015,878 A | | 5/1991 | Lasagna et al. |
| 5,084,696 A | * | 1/1992 | Guscott et al. ................ 340/541 |
| 5,451,867 A | | 9/1995 | Loreck et al. |
| 5,477,142 A | * | 12/1995 | Good et al. .................... 324/166 |

OTHER PUBLICATIONS

"Frequency to Voltage Converter." LM2907/LM2917 National Semiconductor. DS007942 May 2003 pp. 1-21.
"Variable Reluctance Sensor Interfaces with Differential Input and Adaptive Peak Threshold." Maxim Integrated Products. pp. 1-23 19-4283; Rev.3; 3/11 MAX9924-MAX9927.

* cited by examiner

*Primary Examiner* — Melissa Koval
*Assistant Examiner* — Daniel Miller
(74) *Attorney, Agent, or Firm* — Gary Stanford

(57) ABSTRACT

A variable reluctance sensor system for processing a variable reluctance sensor signal including an arming comparator and an arming circuit. The arming comparator compares the variable reluctance sensor signal with an arming threshold which decreases proportional to 1/t from a predetermined maximum level and asserts an armed signal when the variable reluctance sensor signal reaches the arming threshold. The arming threshold may be decreased based on a scaling factor multiplied by 1/t to ensure detection of each pulse of the variable reluctance sensor signal. The arming threshold may decrease to a predetermined minimum level sufficiently low to intersect the variable reluctance sensor signal and sufficiently high relative to an expected noise level. The arming threshold is reset in response to a timing event, such as zero crossing of the variable reluctance sensor signal.

20 Claims, 3 Drawing Sheets

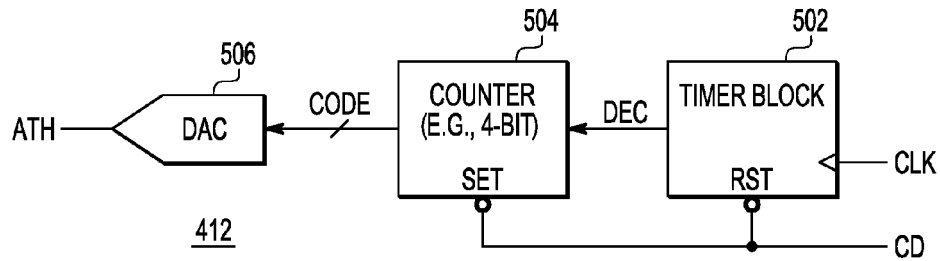
FIG. 5
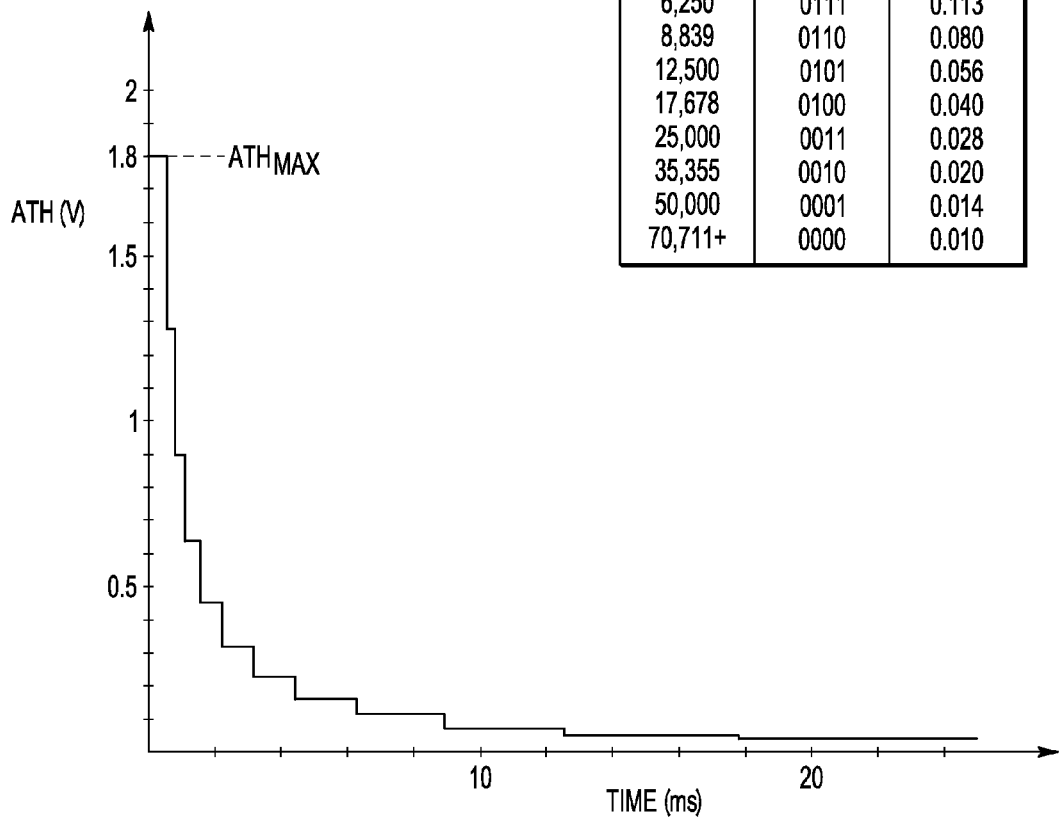
FIG. 6
FIG. 7

VRS INTERFACE WITH 1/T ARMING FUNCTION

BACKGROUND OF THE INVENTION

1. Field of the Invention

The present invention relates generally to variable reluctance sensors, and more particularly to a variable reluctance sensor interface with an arming function proportional to a 1/t timing function.

2. Description of the Related Art

A variable reluctance (VR) sensor is used to measure the angular position and speed of a moving or rotating ferromagnetic object. One such application is the crankshaft of an automobile. For example, a toothed ferrous (iron based) wheel is mounted to the crankshaft and the VR sensor is used to sense each passing tooth during rotation of the crankshaft. The crankshaft position and top dead center (TDC) are used to set engine timing for electronic engine control including ignition and fuel injection timing and the like. The TDC is usually established relative to a missing tooth of the wheel. The VR sensor typically includes a coil and biasing magnet positioned near the toothed wheel, in which each tooth passing by the VR sensor changes the magnetic flux which is converted to an electrical voltage induced in the coil. A VR sensor (VRS) interface senses and conditions the electrical signal to derive timing parameters. In this manner, the rotating motion of the crankshaft is converted to an electronic signal which is used to determine the position and speed of the crankshaft.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 5 is a simplified block diagram of the threshold block of FIG. 4 according to a digital conversion embodiment;

FIG. 6 is a table listing discrete time (T), ATH voltages and corresponding digital code values according to one embodiment of the threshold block of FIG. 5; and FIG. 7 is a timing diagram plotting ATH in volts versus time in milliseconds for the threshold block of FIG. 5 implemented according to the Table of FIG. 6.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Accurate measurement using the electrical signal from the VR sensor is made more difficult with various physical properties of the electro-mechanical systems, such as synchronous and asynchronous noise, the dynamic range of the input signal, and signal variations caused by aging and mechanical tolerances, such as tooth variations, relative placement between the sensor and tooth placement, etc.

Figure 1:
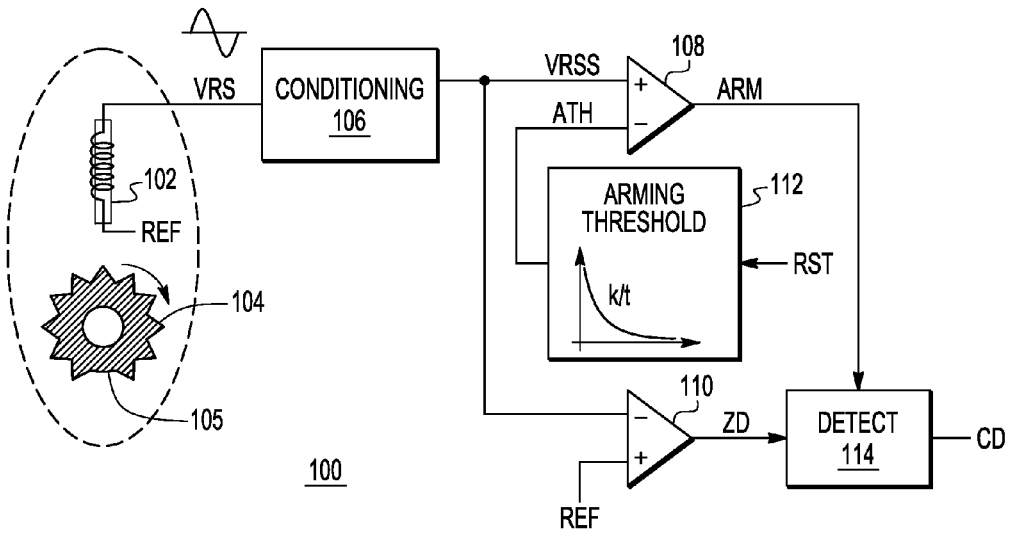
FIG. 1 is a simplified schematic and block diagram of a VRS interface implemented according to one embodiment for interfacing a VR sensor.

FIG. 1 is a simplified schematic and block diagram of a VRS interface 100 implemented according to one embodiment for interfacing a VR sensor 102. In the illustrated configuration, the VR sensor 102 includes a coil and biasing magnet which is orthogonally positioned relative to a trigger wheel mounted to a crankshaft (not shown) or other rotating member. The trigger wheel may be made in any one of many different ways. In this illustrated configuration, the trigger wheel is configured as a toothed wheel 104 in which the VR sensor 102 senses each passing tooth. As the toothed wheel 104 rotates, each passing tooth changes the magnetic flux of the biasing magnet through the coil, and the coil converts the changing magnetic flux to an electrical signal VRS.

The form of the electrical signal VRS is shown in the approximate form of a sinusoidal pulse. The actual form of the VRS signal, however, depends on various system parameters, such as the shape and configuration of the teeth, position and orientation of the VR sensor 102, etc., and is not limited to a sinusoidal form. The coil, and thus the VRS signal, is referenced to a reference voltage level REF. REF may be any suitable positive, negative or ground (e.g., 0 volts) voltage level. The VRS signal is provided to the input of a conditioning circuit 106, which provides a conditioned or adjusted VRS signal shown as VRSS provided to the non-inverting (+) input of an arming comparator 108 and to the inverting (−) input of a detect comparator 110. The conditioning circuit 106 may include appropriate components, such as filtering and clamp devices as described further herein, to condition the VRS signal for the circuitry of the VRS interface 100.

An arming threshold circuit 112 provides an arming threshold signal ATH to the inverting input of the arming comparator 108, which outputs an armed signal ARM to one input of a detect circuit 114. The ARM signal denotes an armed condition when asserted or otherwise provided. REF is provided to the non-inverting input of the detect comparator 110, which outputs a detect signal ZD to another input of the detect circuit 114. The detect circuit 114 asserts or otherwise transitions a detect output signal CD in response to ZD after the ARM signal has indicated an armed condition. A reset signal RST is provided to an input of the arming threshold circuit 112 to reset ATH for detecting the next event or cycle of the VRS signal (via the VRSS signal). RST may be asserted by the detect circuit 114 or by another timing control circuit (not shown). CD is the output signal used to determine the position and speed of the rotating toothed wheel 104.

Figure 2:
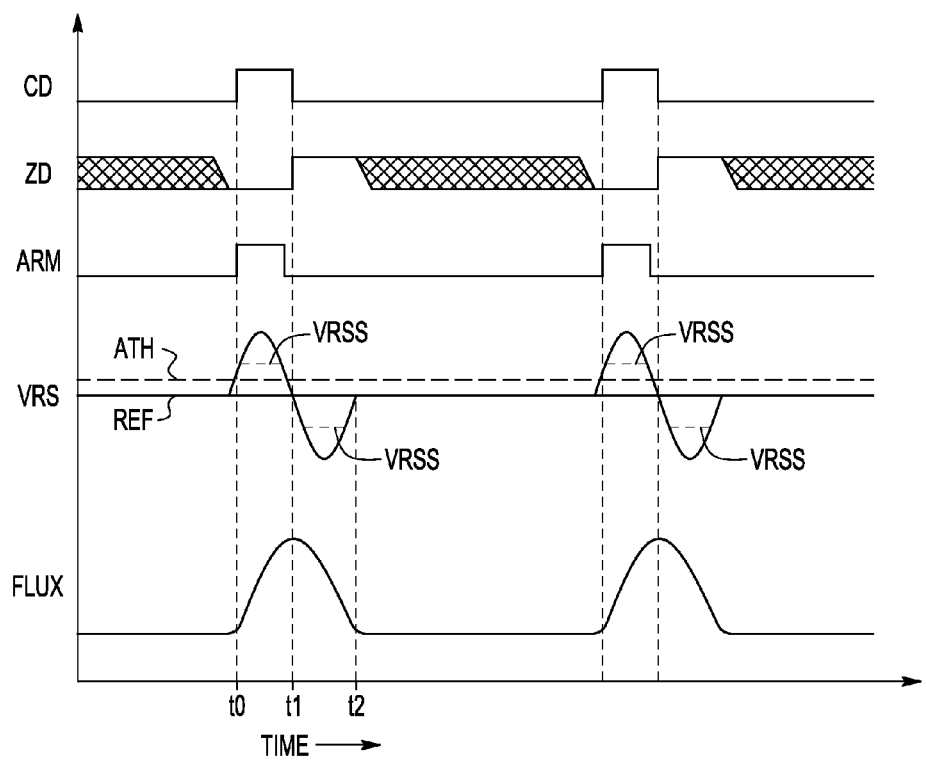
FIG. 2 is a timing diagram illustrating operation of the VRS interface of FIG. 1.

FIG. 2 is a timing diagram illustrating operation of the VRS interface 100, in which signals CD, ZD, ARM, VRS, and FLUX are plotted versus time. VRSS is represented with dashed lines illustrating modification of VRS by the conditioning circuit 106. FLUX shows the change of magnetic flux of the VR sensor 102 in response to passing teeth during rotation for the illustrated embodiment. The VRS signal is shown as a pulse signal including a positive pulse closely followed by a negative pulse approximately centered at the reference voltage level REF indicative of the rate of change of FLUX. The shape of the pulse signal is shown as an approximate sinusoidal pulse for purposes of illustration. The actual shape of FLUX signal and the corresponding shape of the positive and negative pulses on VRS, however, varies with different configurations and is not necessarily sinusoidal. Each pulse of VRS increases above REF as a tooth edge approaches the VR sensor 102 until it reaches a peak magnitude indicative of maximum magnetic flux change when the tooth edge is almost aligned with the VR sensor 102. Each pulse of VRS then decreases and intersects REF at a maximum flux level when the tooth is aligned with the VR sensor 102, and then falls below REF as the tooth begins to retreat from the VR sensor 102 reaching a negative peak. The pulse eventually returns to REF when the tooth has passed. The next tooth generates similar positive and negative pulses relative to REF after any dead-time period between consecutive teeth. As noted above, REF is any suitable voltage level and may represent a common mode voltage level in one embodiment.

The ATH signal is shown as a dashed line at a constant voltage level superimposed with the VRS signal, in which it is understood that in actual operation, ATH varies with time as further described herein. VRS is initially low, ZD is indeterminate, and ARM is low. When VRS rises above ATH at a time t0, the arming comparator 108 asserts ARM indicating to the detect circuit 114 that a detect event is imminent. The detect circuit 114 detects ARM going high and asserts the CD signal high at time t0. Since VRS is above REF, the detect comparator 110 asserts ZD low. VRS rises to a peak and falls as previously described (whereas VRSS is capped at a predetermined value). ARM goes back low when VRS falls back below ATH.

When VRS crosses below REF at a time t1 coincident with a peak magnitude of FLUX, the detect comparator 110 asserts ZD high. In response, the detect circuit 114 asserts CD low at time t1. This "zero detect" event at time t1 occurs when the center of a tooth is aligned with the VR sensor 102 and denotes the significant timing event during each cycle. Thus, the CD signal going high denotes the armed condition, and the CD signal going low denotes the zero cross event which is coincident with the zero crossing of the pulse (and thus the center of a passing tooth) during each cycle. It is noted that the zero detect event occurs when VRS crosses REF in the middle of the cycle indicating alignment of the center of the tooth regardless of the actual voltage level of REF (which may or may not be at 0V). VRS returns to REF at time t2 and generally remains at REF until the beginning of the next cycle. As indicated by cross-hatching, ZD may be indeterminate or "don't care" between cycles.

As shown in FIG. 2, the pulses generated by the VR sensor 102 are generated in response to the change of magnetic flux caused by each passing tooth. The peak amplitude or magnitude of each pulse varies with the rate at which a tooth passes by the VR sensor 102, in which the rate may be measured in revolutions per minute (RPM) of the rotating toothed wheel 105. Because the electromotive force (EMF) generated by the VR sensor 102 depends on the change of the magnetic flux with time, or d(flux)/dt, the peak magnitude of the pulse signal depends on the speed. The duration or period of each VRS pulse also changes with speed, in which the period of the pulse is shorter at a higher speed. Thus, the pulses of VRS have greater peaks which occur sooner and with greater frequency at higher speeds, and the pulses have smaller peaks which occur later and with less frequency at lower speeds.

The VRS and VRSS signals are include various types of noise, such as white noise, random or asynchronous noise, correlated or synchronous noise, noise bursts, ripple noise riding on top of the input, etc. The VRS and VRSS signals are thus associated with a signal to noise ratio (SNR) parameter. It has been determined that the optimal arming threshold should also vary with speed. The arming threshold circuit 112 automatically adjusts the arming threshold ATH to the expected input signal regardless of the rate of speed of the wheel 104. In particular, the arming threshold ATH automatically decays with k/t to track the expected signal amplitude automatically at any wheel speed, in which "t" denotes time and "k" denotes a proportionality constant or scaling factor. The 1/t function dynamically maximizes SNR by matching the hysteresis decay rate to the amplitude versus frequency of the VR sensor 102. The automatic adjustment of the arming threshold as described herein effectively reduces the probability of falsely detecting or otherwise missing a tooth.

Figure 3:
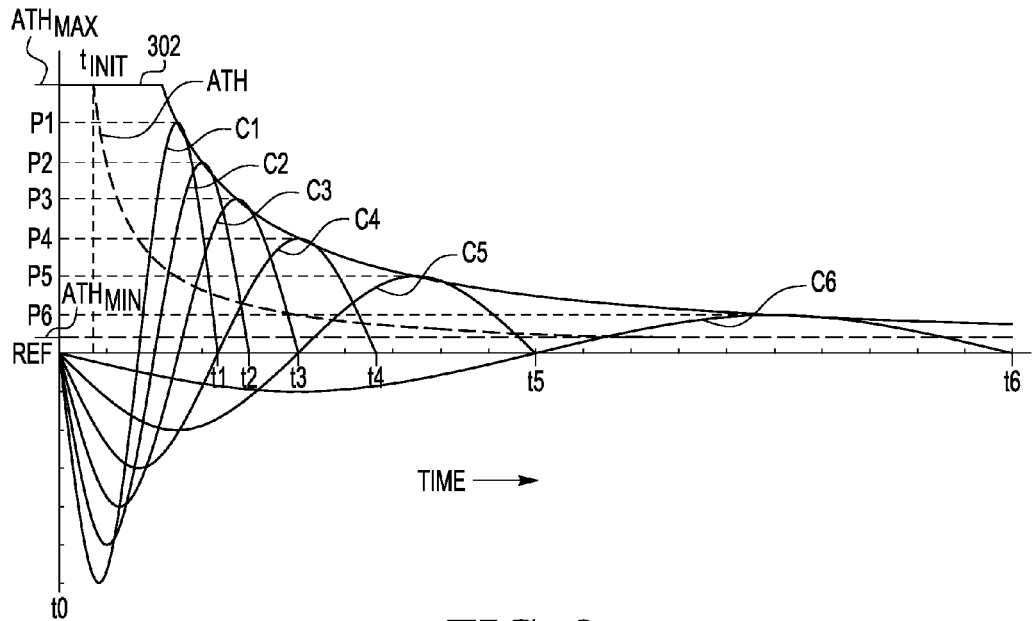
FIG. 3 is a timing diagram including a set of VRS signal curves C1-C6 and the ATH signal plotted versus time illustrating the relationship between duration and peak magnitude of corresponding VRS pulse signals for different rotational speeds.

FIG. 3 is a timing diagram including a set of VRS signal curves C1-C6 and the ATH signal plotted versus time illustrating the relationship between duration and peak magnitude of corresponding VRS pulse signals for different rotational speeds. Each VRS signal curve is illustrated as in the approximate form of a sinusoidal pulse at a corresponding one of different rotation speeds beginning at a common initial time t0 and referenced relative to REF. Also, each pulse is shown initially going negative and then positive which appears inverted relative to the pulses shown in FIG. 2. As further described herein, the ATH signal is initiated at the zero crossing detect from the prior cycle of the previous tooth to ensure capture of the next tooth. As shown, a first VRS signal curve C1 reaches a first peak level P1 and then falls back to REF at a first time t1. The next VRS signal curve C2 reaches a second peak level P2 and then falls back to REF at a second time t2. The VRS signal curve C2 represents a slower speed as compared to the VRS signal curve C1 in which P2 is less than P1 and the period between t0 and t2 (t2-t0) is greater than the period t1-t0. In similar manner, the remaining VRS signal curves C3-C6 with respective peak levels P3-P6 and corresponding periods t3-t0, t4-t0, t5-t0, and t6-t0, respectively, represent decreasing speed levels. A peak magnitude envelope curve 302 represents the decay of the peak magnitude with reduction of speed.

The dynamic range represented by the set of VRS signal curves C1-C6 is relatively narrow and represents speeds at the lower end of the spectrum. In an automotive embodiment representing crankshaft speed, the dynamic range is very large, such as from several millivolts (mV) to several hundred volts (V). In one specific embodiment, for example, the dynamic range is about 50 mV to about 200V. At higher speeds the VRS pulses are large so that ATH may be relatively large. At lower speeds including idle, the VRS pulses are small; it is desired that ATH be as high as possible for as long as possible but without being too high to avoid missing any pulses. Since the speed may change at any time, the level of ATH changes accordingly to ensure detection of each pulse. ATH should not go so low, however, to be affected by spurious noise spikes or the like which may cause false triggering.

As described herein, the arming threshold ATH automatically adjusts with the VRS signal to track the expected signal amplitude to ensure proper arming and to avoid missing teeth transitions. When the VRS signal is generated at higher speeds resulting in peak magnitude values above a certain maximum threshold, shown as $ATH_{MAX}$, the arming threshold ATH at $ATH_{MAX}$ is sufficiently high to ensure capture of the pulse regardless of how large. For example, in one embodiment $ATH_{MAX}$ is about 3-5V which is sufficiently high to ensure detection of pulses up to 200V or larger. In this manner, ATH is initially at $ATH_{MAX}$. At lower speeds in which the peak level drops below $ATH_{MAX}$, ATH decreases at the appropriate rate to ensure detection of the pulse regardless of speed.

In the illustrated embodiment, the magnitude envelope curve 302 decays at a rate of j/t, in which "j" represents a scaling factor based on the variables of a given electro-mechanical system. As shown, at an initial time $t_{INIT}$ after time t0, ATH decays from $ATH_{MAX}$ at a rate of k/t, in which "k" also represents a scaling factor based on the variables of the given electro-mechanical system and in which k<j. The scaling factor k is determined empirically for a given system to ensure detection of a VRS pulse at any speed within an expected dynamic range of the system. ATH is clamped at the low end at a predetermined minimum value $ATH_{MIN}$ to ensure capture of pulses with the smallest expected peak while being sufficiently high to account for noise (white, synchronous, asynchronous, bursts, ripples, etc.) and any expected signal variability, such as tooth variations and other system parameters.

Conceptually, ATH may begin at a value which is greater than the expected maximum peak level (e.g., greater than 200V) at the highest expected speed. The initial reset time for each cycle is the zero detect event of the prior cycle. Then ATH decays at the rate of k/t to ensure that it is below the level of any pulse that may occur at that time. In this manner, ATH changes at an appropriate rate to capture any pulse at any speed within the expected dynamic range. The illustrated ATH curve generally follows the same k/t decay pattern, but is limited at the upper end by $ATH_{MAX}$ and at the lower end by $ATH_{MIN}$.

Referring back to FIG. 1, the arming threshold circuit 112 generates the arming threshold signal ATH to follow k/t within the range of $ATH_{MAX}$ and $ATH_{MIN}$. The RST signal is asserted to initiate the ATH signal for each cycle. In one embodiment, RST is asserted coincident with CD going low in each cycle so that ATH is initiated at zero detect from the last cycle. The conditioning circuit 106 may clip the peak values (positive and negative) of the VRS pulses and reduce current level so that VRSS maintains pulse timing while remaining within suitable values for the comparator circuits.

Figure 4:
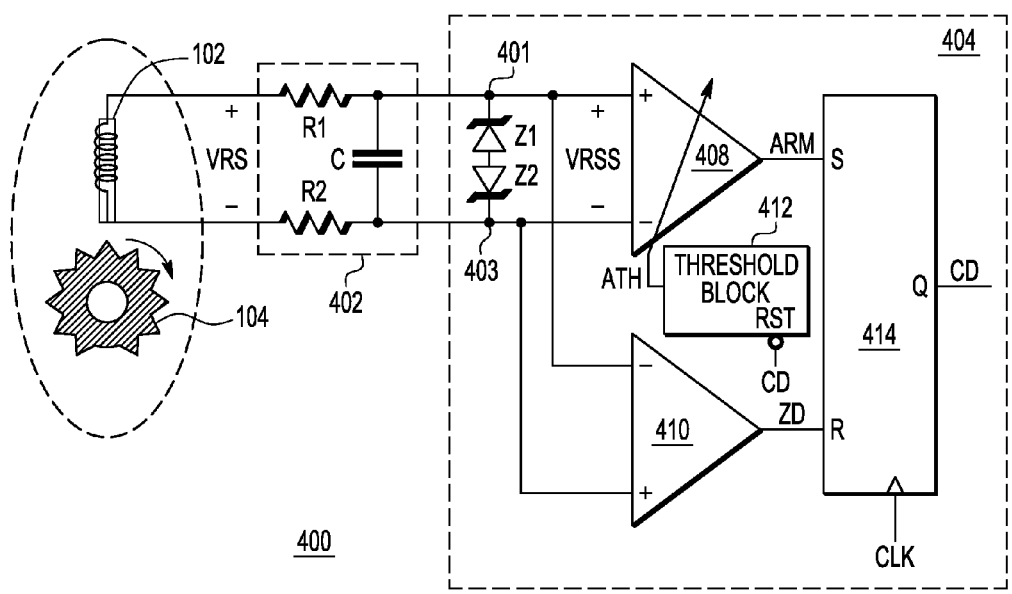
FIG. 4 is a simplified schematic and block diagram of a VRS interface implemented according to another embodiment for interfacing the VR sensor.

FIG. 4 is a simplified schematic and block diagram of a VRS interface 400 implemented according to another embodiment for interfacing the VR sensor 102. In this case, the VR sensor 102 provides the VRS signal as a differential signal (with positive and negative polarities) differentially coupled to inputs of a filter circuit 402. The filter circuit 402 has differential outputs coupled to corresponding input nodes 401 and 403 of a detection circuit 404. Within the detection circuit 404, a pair of Zener diodes Z1 and Z2 are coupled between differential input nodes 401 and 403 to limit the positive and negative peaks to predetermined voltage levels. Node 401 is coupled to the non-inverting input of a variable offset comparator 408 and to the inverting input of a zero offset comparator 410, and node 403 is coupled to the inverting input of the comparator 408 and to the non-inverting input of the comparator 410. The differential voltage between nodes 401 and 403 is the filtered and clipped differential signal VRSS. The output of the comparator 408 provides the ARM signal to the set (S) input of a set-reset latch 414 and the output of the comparator 410 provides the ZD signal to the reset (R) input of the latch 414. The Q output of the latch 414 provides the CD signal. The CD signal is provided to an inverting reset (RST) input of a threshold block 412, which provides the ATH signal to the offset input of the comparator 408.

The filter circuit 402 includes series resistors R1 and R2 coupled to a parallel filter capacitor C. The values of R1, R2 and C are selected based on the particular implementation and configuration of the VR sensor 102 to limit input current and to filter the VRS signal to provide the corresponding VRSS signal. The detection circuit 404 may be implemented on a separate integrated circuit (IC) or the like, in which nodes 401 and 403 form a differential input for the VR sensor interface chip. The Zener diodes Z1 and Z2 are configured to limit the voltage level of VRSS to within a maximum acceptable range for the detection circuit 400.

Operation of the VRS interface 400 is substantially similar to that of the VRS interface 100 and as illustrated in FIG. 2. In this case, the VRS signal is a differential signal which is filtered and clipped. When CD is asserted low from a prior cycle, the threshold block is reset and ATH is initialed to its maximum level $ATH_{MAX}$. The negative peak (which is filtered and clipped) of the VRS signal does not trip the arming comparator 408. In the following cycle as the next tooth approaches the VR sensor 102, a positive peak occurs on VRS. If the speed is sufficiently high, then VRSS rises above $ATH_{MAX}$ and ARM goes high setting the latch 414 so that CD goes high. If the speed is relatively low, even as slow as idle (e.g., relatively low RPM, such as 100 RPM or the like), the threshold block 412 decreases ATH with k/t to decrease the offset of the comparator 408 so that the offset is sufficiently low to detect the next pulse and set the latch 414. When VRS, and thus VRSS, goes through zero, the zero detect comparator 410 asserts ZD which resets the latch 414 pulling CD back low. Also, the threshold block 412 resets ATH high for the next cycle in response to CD going low.

FIG. 5 is a simplified block diagram of the threshold block 412 according to a digital conversion embodiment. The illustrated threshold block 412 includes a timer block 502, a counter 504 and a digital to analog converter (DAC) 506. The timer block 502 receives a clock signal CLK at its clock input and has an inverting reset (RST) input receiving the CD signal. CLK is toggled at any suitable frequency for a given configuration. In one embodiment, CLK has a frequency of 1 megahertz (MHz) or greater. The timer block 502 outputs a decrement signal DEC to an input of the counter 504. The counter 504 has an inverting set input receiving CD and outputs a digital CODE value to an input of the DAC 506. In one embodiment, the counter 504 is a 4-bit counter asserting CODE as a 4-bit digital input to the DAC 506. A 4 bit system provides a practical configuration, although the number of bits may be determined according to the particular configuration and may be more or less than 4 bits. The DAC 506 converts CODE to ATH as an analog voltage, which is provided to the offset input of the arming comparator 408 as previously described.

The threshold block 412 generally implements the equation ATH=k/t in which "k" is a scaling factor determined for the particular system parameters and "t" denotes time. When t is zero at the beginning of an arming cycle, k/t would otherwise be infinite. In the practical configuration, ATH instead is clamped at $ATH_{MAX}$ until the k/t function would otherwise fall to this maximum value, and then ATH follows the k/t function until it reaches the predetermined minimum value $ATH_{MIN}$. ATH then remains at $ATH_{MIN}$ until the circuit is reset for the next cycle. The threshold block 412 is a digital configuration for implementing the k/t function.

In operation, when CD is asserted low, the timer block 502 resets operation and the counter 504 is set to assert CODE to the binary value of 1111b (in which "b" denotes a binary value). The DAC 506 receives CODE=1111b and outputs a voltage corresponding to $ATH_{MAX}$. The timer block 502 determines time using CLK, which is set to a predetermined frequency in one embodiment. After an initial time delay, the timer block 502 asserts a pulse on DEC and the counter 504 decrements CODE to 1110b. The DAC 506 responds by reducing ATH by a corresponding amount. After a second time delay, the timer block 502 asserts another pulse on DEC, the counter 504 decrements CODE to 1101b, and the DAC 506 responds by reducing ATH by another corresponding amount. Operation continues in this manner until CODE reaches zero or 0000b, and the DAC 506 outputs a voltage corresponding to $ATH_{MIN}$. The timer block 502 does not provide any more pulses on DEC so that ATH remains at $ATH_{MIN}$ until CD is asserted low upon detecting an event in a prior cycle to reset the circuit for the next cycle.

The threshold block 412 may be programmed to operate in any one of several different manners to implement the k/t function. For example, the timer block 502 may assert DEC at equal time intervals, in which case the DAC 506 is configured or programmed to incorporate the k/t function. In another configuration, the timer block 502 varies the consecutive delay periods to implement the k/t function and the DAC 506 is linear. In either of these cases, however, the resolution of the DAC 506 may need to be relatively high, such as comprising a larger number of bits. In another embodiment, the k/t function is distributed between the timer block 502 and the DAC 506 as further described herein, which enables the DAC 506 to have a lower resolution and thus a reduced number of bits (e.g., enables 4 bits as shown).

The scaling factor k represents a change in flux in the coupling between the rotor and the pickup coil of the VR sensor 102. The scaling factor k is a fixed value having units of volt-seconds (or V·s) to convert time t into the voltage ATH. $ATH_{MIN}$ is selected for a given system sufficiently low to ensure detection of the smallest expected VRS pulse while sufficiently high to avoid noise and false detections. $ATH_{MAX}$ is selected sufficiently low to avoid higher level noise at the higher pulse levels while being sufficiently high to ensure detection of the larger pulses. The timer increments and the DAC resolution are selected based on these factors.

In a more specific configuration, k is assumed to have a typical value of 1 mV·s (millivolts multiplied by seconds) for the illustrated embodiment. $ATH_{MIN}$ is selected to be 10 mV and the DAC 506 is configured as a 4-bit exponential DAC providing ATH according to the following equation 1:

$$ATH = 10 \text{ mV} \cdot 2^{CODE/2} \quad (1)$$

in which CODE varies from a high value of 1111b=15 to a low value of 0000b=0. The maximum value of ATH is determined using CODE=15, so that $ATH_{MAX}$=1.8V. The initial delay period T0 of the timer block 502 is derived from equation 1 using CODE=15 according to the following equation 2:

$$T(0) = \frac{k = 1 \text{ m}}{10 \text{ m} \cdot 2^{15/2}} = 552 \text{ μs} \quad (2)$$

Each subsequent time period is selected according to the following equation 3:

$$T(n+1) = T(n) \cdot \sqrt{2} \quad (3)$$

beginning with n=0 and in which n is incremented to determine the next time period up to a predetermined maximum value for n. CODE is a digital value corresponding to n, in which CODE is decremented from 15 to 0 for each subsequent timing step.

FIG. 6 is a table listing discrete time (T), ATH voltages and corresponding digital code values (CODES) according to one embodiment of the threshold block of FIG. 5. The values of ATH (V) are determined according to equation (1) for k=1 mV·s, for the time values T (corresponding to "t" for k/t) in microseconds (μs) according to equations (2) and (3), and for CODE ranging from 15 to 0. As shown, $ATH_{MAX}$ is 1.8V during an initial time period from 0 to about 552 μs when CODE=1111b=15. After about 552 μs, the timer block 502 asserts DEC so that the counter 504 decrements CODE to 1110b=14 in which ATH decreases to about 1.273V. After another 229 μs at about time 781 μs, the timer block 502 asserts DEC so that the counter 504 decrements CODE to 1101b=13 in which ATH decreases to about 0.9V. After another 324 μs at about time 1,105 μs, the timer block 502 asserts DEC so that the counter 504 decrements CODE to 1100b=12 in which ATH decreases to about 0.636V. Operation continues in this manner until CODE decrements to 0000b=0 after 70,711 μs in which ATH decreases to $ATH_{MIN}$ of about 10 mV. As indicated by the notation 70,711+, the DAC 506 continues to output 10 mV until CODE is reset back to 1111b.

FIG. 7 is a timing diagram plotting ATH in volts versus time in milliseconds (ms) for the threshold block 412 implemented according to the Table of FIG. 6. The digital stair-step function simulates the k/t function over time for each cycle. In this manner, the level of ATH automatically adjusts according to the expected pulse magnitude at any given time to ensure that each pulse is detected at any given speed within the expected dynamic range of speeds.

A variable reluctance sensor interface for processing a variable reluctance sensor signal according to one embodiment includes an arming comparator and an arming circuit which provides an arming threshold to the arming comparator. The arming comparator includes a first input for receiving the variable reluctance sensor signal, a second input receiving the arming threshold, and an output providing an armed signal when the variable reluctance sensor signal reaches the arming threshold. The arming circuit resets the arming threshold to a predetermined maximum level in response to assertion of a reset signal and decreases the arming threshold proportional to 1/t after being reset.

A detection system may be provided, such as including a detect comparator and a detect circuit, for providing a crossing signal and for providing a detect signal when the crossing signal is provided after the armed signal indicates an armed condition. The detect signal may be used as the reset signal.

A method of processing a variable reluctance sensor signal according to one embodiment includes providing an arming threshold which decays from a predetermined maximum level to a predetermined minimum level proportional to 1/t in which t denotes elapsed time, and comparing the variable reluctance sensor signal with the arming threshold and providing an armed signal when a magnitude of the variable reluctance sensor signal becomes greater than the arming threshold. The method may further include comparing the variable reluctance sensor signal with a reference level and providing a crossing signal when a magnitude of the variable reluctance sensor signal crosses the reference level, providing a detect signal when the crossing signal is asserted while the armed signal is provided, and resetting the arming threshold to the predetermined maximum level when the detect signal is provided.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A variable reluctance sensor interface for processing a variable reluctance sensor signal, comprising:
   an arming comparator including a first input for receiving the variable reluctance sensor signal, including a second input receiving an arming threshold, and including an output providing an armed signal when the variable reluctance sensor signal reaches said arming threshold; and
   an arming circuit for providing said arming threshold to said arming comparator, wherein said arming circuit resets said arming threshold to a predetermined maximum level in response to assertion of a reset signal and wherein said arming circuit decreases said arming threshold proportional to 1/t after being reset, in which t denotes elapsed time.

2. The variable reluctance sensor interface of claim 1, wherein said arming circuit decreases said arming threshold according to a function k/t in which k comprises a scaling factor which is determined based on characteristics of a variable reluctance sensor providing the variable reluctance sensor signal.

3. The variable reluctance sensor interface of claim 2, wherein the variable reluctance sensor signal comprises at least one pulse having a peak magnitude which is an inverse function of time from pulse onset, and wherein said scaling factor is determined to ensure that said arming threshold is less than said peak magnitude when it occurs.

4. The variable reluctance sensor interface of claim 1, wherein said arming circuit maintains said arming threshold at said predetermined maximum level for a predetermined delay period after assertion of said reset signal before decreasing said arming threshold.

5. The variable reluctance sensor interface of claim 1, wherein said arming circuit decreases said arming threshold to a predetermined minimum level which intersects the variable reluctance sensor signal and which is higher than an expected noise level.

6. The variable reluctance sensor interface of claim 1, wherein the variable reluctance sensor signal comprises at least one pulse having a magnitude relative to a reference level in which the magnitude is an inverse function of time from pulse onset, and wherein said variable reluctance sensor system further comprises:
   a detection circuit having an output asserting said reset signal when the variable reluctance sensor signal reaches a reference level after said armed signal indicates an armed condition.

7. The variable reluctance sensor interface of claim 1, wherein said arming circuit comprises:
   a timing block providing a count control signal;
   a counter receiving said count control signal and providing a corresponding digital code value; and
   a digital to analog converter receiving said digital code value and providing said arming threshold.

8. The variable reluctance sensor interface of claim 7, wherein:
   said timing block asserts a pulse on said count control signal after each of a plurality of predetermined time periods after assertion of said reset signal;
   wherein said counter resets said digital code value to a predetermined maximum value upon assertion of said reset signal, and decrements said digital code value in response to a pulse on said count control signal; and
   wherein said digital to analog converter provides said arming threshold as a function of said digital code value.

9. The variable reluctance sensor interface of claim 8, wherein each subsequent one of said plurality of predetermined time periods is determined by multiplying a previous time period by a constant factor, and wherein said digital to analog converter asserts said arming threshold as an exponential function of said digital code value.

10. The variable reluctance sensor interface of claim 1, wherein the variable reluctance sensor signal comprises a differential signal and wherein said arming comparator includes a differential input for receiving the variable reluctance sensor signal.

11. The variable reluctance sensor interface of claim 1, further comprising a clamp circuit for limiting a peak magnitude of the variable reluctance sensor signal.

12. The variable reluctance sensor interface of claim 1, further comprising:
   a detect comparator having an input for receiving the variable reluctance sensor signal and an output providing a crossing signal when the variable reluctance sensor signal reaches a reference level; and
   a detect circuit which provides a detect signal when said crossing signal is provided after said armed signal indicates an armed condition.

13. The variable reluctance sensor interface of claim 12, wherein said detect signal is used as said reset signal.

14. A method of processing a variable reluctance sensor signal, comprising:
   providing an arming threshold which decays from a predetermined maximum level to a predetermined minimum level proportional to 1/t in which t denotes elapsed time; and
   comparing the variable reluctance sensor signal with the arming threshold and providing an armed signal when a magnitude of the variable reluctance sensor signal becomes greater than the arming threshold.

15. The method of claim 14, wherein the variable reluctance sensor signal comprises a differential signal and wherein said comparing includes receiving the variable reluctance signal at a differential input.

16. The method of claim 14, wherein said providing an arming threshold comprises decaying the arming threshold according to a function k/t in which k comprises a scaling factor which is determined based on characteristics of a variable reluctance sensor providing the variable reluctance sensor signal.

17. The method of claim 15, wherein said providing an arming threshold comprises maintaining the arming threshold at the predetermined maximum level for a delay period based on when the arming threshold would otherwise decay to the predetermined maximum level after being reset.

18. The method of claim 14, further comprising:
   comparing the variable reluctance sensor signal with a reference level and providing a crossing signal when a magnitude of the variable reluctance sensor signal crosses the reference level;
   providing a detect signal when the crossing signal is provided while the armed signal is provided; and
   resetting the arming threshold to the predetermined maximum level when the detect signal is provided.

19. The method of claim 18, wherein said providing an arming threshold comprises:

asserting a count control signal after each of a plurality of predetermined time periods after the detect signal is provided;

resetting a digital code value to a predetermined maximum value when the detect signal is provided, and decrementing the digital code value in response to each assertion of the count control signal; and converting the digital code value to the arming threshold.

20. The method of claim 19, further comprising increasing a subsequent one of the predetermined time periods by a constant factor relative to a current one of the predetermined time periods, and wherein said converting the digital code value to the arming threshold comprises exponentially decreasing each subsequent arming threshold level based on the digital code value.

\* \* \* \* \*